US010271039B2

(12) United States Patent
Tubic et al.

(10) Patent No.: US 10,271,039 B2
(45) Date of Patent: Apr. 23, 2019

(54) STRUCTURED LIGHT MATCHING OF A SET OF CURVES FROM TWO CAMERAS

(71) Applicant: CREAFORM INC., Lévis (CA)

(72) Inventors: Dragan Tubic, Québec (CA); Martin Soucy, Québec (CA); Olivier Gignac, Québec (CA); Antoine Thomas Caron, Québec (CA)

(73) Assignee: Creaform Inc., Lévis (CA)

( * ) Notice: Subject to any disclaimer, the term of this patent is extended or adjusted under 35 U.S.C. 154(b) by 204 days.

(21) Appl. No.: 15/114,563

(22) PCT Filed: Feb. 4, 2015

(86) PCT No.: PCT/IB2015/050856
§ 371 (c)(1),
(2) Date: Jul. 27, 2016

(87) PCT Pub. No.: WO2015/118467
PCT Pub. Date: Aug. 13, 2015

(65) Prior Publication Data
US 2016/0350929 A1 Dec. 1, 2016

Related U.S. Application Data

(60) Provisional application No. 61/936,033, filed on Feb. 5, 2014.

(51) Int. Cl.
*G06K 9/00* (2006.01)
*H04N 13/246* (2018.01)
(Continued)

(52) U.S. Cl.
CPC .......... *H04N 13/246* (2018.05); *G01B 11/25* (2013.01); *G06K 9/4609* (2013.01); *G06T 7/521* (2017.01);
(Continued)

(58) Field of Classification Search
CPC ........... H04N 13/0246; H04N 13/0203; H04N 13/0275; H04N 13/0018; H04N 13/0282;
(Continued)

(56) References Cited

U.S. PATENT DOCUMENTS 5,383,013 A   1/1995 Cox
5,432,712 A * 7/1995 Chan ..................... G01C 11/06
                                                   348/E13.014

(Continued)

FOREIGN PATENT DOCUMENTS

CN   101089551 A   12/2007
CN   101627280 A    1/2010
(Continued)

OTHER PUBLICATIONS

Ernst, V.G.S., et al., A Surface Relief Meter Based on Trinocular Vision, University of Twente, The Netherlands, and Institute of Agricultural and Environmental Engineering (IMAG-DLO), The Netherlands, Conference on Image Processing and its Applications, Jul. 4-6, 1995, Conference Publication No. 410, © IEE 1995.
(Continued)

*Primary Examiner* — Euengnan Yeh
(74) *Attorney, Agent, or Firm* — Pearl Cohen Zedek Latzer Baratz LLP

(57) ABSTRACT

A method for matching points between two images of a scene acquired by two cameras, the method including: extracting blobs from the reflection in the images and individually labelling the blobs with a unique identifier; selecting a selected epipolar plane and defining a conjugate epipolar line on each of the images; identifying plausible combinations including a light sheet label of the projected pattern and the unique identifier for a plausible blob selected from the blobs in each of the images; calculating a matching error for each of the plausible combinations; repeating the
(Continued)

steps of selecting, identifying and calculating for at least some epipolar planes; determining a most probable combination by computing a figure of merit for the plausible combinations; identifying matching points in the frame from the most probable combination.

12 Claims, 11 Drawing Sheets

(51) Int. Cl.
| | |
|---|---|
| *G01B 11/25* | (2006.01) |
| *G06K 9/46* | (2006.01) |
| *G06T 7/521* | (2017.01) |
| *G06T 7/593* | (2017.01) |
| *H04N 13/239* | (2018.01) |

(52) U.S. Cl.
CPC ........... *G06T 7/593* (2017.01); *H04N 13/239* (2018.05); *G06T 2207/10021* (2013.01); *G06T 2207/10028* (2013.01); *G06T 2207/10152* (2013.01); *G06T 2207/20068* (2013.01); *G06T 2207/30204* (2013.01); *G06T 2207/30244* (2013.01)

(58) Field of Classification Search
CPC .... H04N 2013/0092; H04N 2013/0074; G06T 7/593; G06T 2207/10012; G06T 2207/10021
See application file for complete search history.

(56) References Cited

U.S. PATENT DOCUMENTS

| | | | | |
|---|---|---|---|---|
| 5,867,591 | A * | 2/1999 | Onda | G01C 11/06 |
| | | | | 348/43 |
| 7,251,356 | B2 | 7/2007 | Seo et al. | |
| 7,487,063 | B2 | 2/2009 | Tubic et al. | |
| 8,032,327 | B2 | 10/2011 | Hebert et al. | |
| 8,538,166 | B2 | 9/2013 | Gordon et al. | |
| 8,836,766 | B1 * | 9/2014 | Hebert | H04N 13/0275 |
| | | | | 348/135 |
| 2011/0134225 | A1 | 6/2011 | Saint-Pierre et al. | |
| 2015/0049345 | A1 | 2/2015 | Miyagawa | |

FOREIGN PATENT DOCUMENTS

| | | |
|---|---|---|
| CN | 102042814 A | 5/2011 |
| CN | 102112845 A | 6/2011 |
| CN | 102175182 A | 9/2011 |
| CN | 106403845 | 2/2017 |
| EP | 1649423 | 4/2006 |
| EP | 2618102 A2 | 7/2013 |
| JP | 2011 530071 A | 10/2012 |
| JP | 2013 210254 A | 10/2013 |
| WO | 2004088245 A1 | 10/2004 |
| WO | 2010015086 A1 | 2/2010 |
| WO | WO 2010/015086 | 2/2010 |
| WO | WO 2013/145655 | 10/2013 |

OTHER PUBLICATIONS

Blais, "A Review of 20 Years of Range Sensor Development", Journal of Electronic Imaging, Jan. 2004, pp. 231-243, vol. 13 (1), NRC.

Longuet-Higgins, A computer algorithm for reconstructin a scene from two projections, Nature, Sep. 10, 1981, pp. 133-135, vol. 293, 1981 Macmillan Journals Ltd, USA.

Kawasaki et al., Dynamic scene shape reconstruction using a single structured light pattern, IEEE Conference on Computer Vision and Pattern Recognition, Jun. 23-28, 2008, 9 pages, IEEE, USA.

Sagawa et al., Dense 3D reconstruction method using a single pattern for fast moving object, 2009 IEEE 12th International Conference on Computer Vision, Sep. 29-Oct. 2, 2009, 9 pages, IEEE, USA.

Kasuya et al., Robust and Accurate one-shot 3D Reconstruction by 2C1P System with Wave Grid Pattern, 2013 International Conference on 3DTV-Conference, Jun. 29-Jul. 1, 2013, 9 pages, IEEE, USA.

Tornslev, 3D scanning using multibeam laser, Master Thesis IMM-Thesis-2005-83, 2005, 13 pages, Technical University of Denmark, Lyngby, Denmark, (published before this application Jul. 2016).

Bruno et al., Experimentation of structured light and sterio vision for underwater 3D reconstruciton, ISPRS Journal of Photogrammetry and Remote Sensing, 2011, pp. 508-518, vol. 66, Issue 4, Elsevier, (published before this application Jul. 2016).

Zhang, G.X., et al., "A Trinocular Vision Probe for Sculptured Surface Measurements", State Key Laboratory of Precision Measuring Technology and Instruments, Tianjin University, China, Proceedings ASPE Summer Topical Meeting on Coordinate Measuring Machines, Jun. 26, 2003 (available at http://www.aspe.net/publications/Summer_2003/Summer_03.html).

Office Action for Chinese Patent Application No. 201580007340X, dated Jul. 4, 2018.

Office Action for Japanese Patent Application No. JP2016-547542, dated Sep. 11, 2018.

* cited by examiner

STRUCTURED LIGHT MATCHING OF A SET OF CURVES FROM TWO CAMERAS

TECHNICAL FIELD

The present invention generally relates to the field of three-dimensional scanning of the surface geometry of an object, and, more particularly, to structured light stereovision.

BACKGROUND OF THE ART

Three-dimensional scanning and digitization of the surface geometry of objects is commonly used in many industries and services, and their applications are numerous. A few examples of such applications are inspection and measurement of shape conformity in industrial production systems, reverse engineering of existing parts with complex geometry, biometry, etc.

The shape of an object is scanned and digitized using a ranging sensor that measures the distance between the sensor and a set of points on the surface. Different principles have been developed for range sensors. Among them, triangulation-based range sensors are generally adequate for close range measurements, such as distances inferior to a few meters. Using this type of apparatus, at least two rays that converge to the same feature point on the object are obtained from two different viewpoints separated by a baseline distance. From the baseline and two ray directions, the relative position of the observed point can be recovered. The intersection of both rays is determined using the knowledge of one side length and two angles in the triangle, which actually is the principle of triangulation in stereovision. The challenge in stereovision is to efficiently identify which pixels correspond to each other in each image of the stereo pair composing a frame. This problem is especially important for portable or hand held scanners where, in the most general case, it is imposed that all necessary information for matching is to be found within a single frame.

To simplify the matching problem, one can replace one of the light detectors with a light projector that outputs a set of rays in known directions. In this case, it is possible to exploit the orientation of the projected rays and each detected ray reflected on the object surface to find the matching point. It is then possible to calculate the coordinates of each observed feature point relative to the basis of the triangle.

Although specialized light detectors can be used, digital CCD or CMOS cameras are typically used.

For the projector, the light source can be a coherent source (laser) or non coherent source (e.g. white light) projecting a spot, a light plane or many other possible patterns. Although the use of a light projector facilitates the detection of reflected points everywhere on the object surface, the more complex the pattern will be, the greater the challenge will be to efficiently identify corresponding pixels and rays.

For this reason, one will further exploit properties from the theory of projective geometry. It has been well known in the field for at least 30 years in the case of two views that one may exploit epipolar constraints to limit the search of corresponding pixels to a single straight line, as opposed to the search in the entire image. This principle is widely exploited both in passive and active (with a projector) stereovision. One example of this usage is described in U.S. Pat. No. 8,032,327 wherein a laser projector projects two perpendicular light planes as a crosshair pattern whose reflection on the surface is captured by two cameras. Projecting thin monochromatic stripes is advantageous for obtaining good signal-to-noise ratio and simplifying image processing to obtain 3D points from each single frame. Having a single stripe observable by each camera insures that each epipolar line intersects the stripe once thus avoiding matching ambiguities.

To reduce the time that is necessary to capture the shape of the surface of an object, one will need either to increase the frame rate or increase the number of stripes that are projected simultaneously, or both. One approach that was proposed consists in projecting a grid of stripes. Projecting a grid is further interesting for surface reconstruction since the projected pattern produces a network of curves on the object surface where tangent curves from two directions make it possible to measure the surface normal. Surface normal information can be advantageously exploited in real-time surface reconstruction from 3D measurements as described in U.S. Pat. No. 7,487,063. Increasing the number of stripes is advantageous for scanning speed but as the number of stripes is increased, the complexity of matching image points before applying triangulation grows exponentially and introduces ambiguities that, in some cases, cannot be resolved.

One way to solve ambiguities consists in adding one or more cameras but the hardware complexity increases and that will reduce the frame rate limit for a given bandwidth. Methods exploiting one or two cameras have been proposed to match points from a projected grid. The intersection of the reflected curves makes it possible to segment and identify connected networks of curve sections to set additional matching constraints. However, points that are extracted near the intersection of two curves are less precise. "Near" means within a distance where image processing operators on pixels from the two curves, interfere. To maintain precision, one will need to discard and thus lose these points.

It would be helpful to alternately produce two sets of non crossing curves to benefit from the surface normal orientation extracted from the surface tangents while avoiding the projection of a grid in a single frame. However, the matching challenge would remain. One solution would consist in projecting multicolored stripes. However, the color reflectivity on some materials would harm the quality of matching and the projector would need to be more complex. Another approach imposes to position an object on a planar background that must be visible in each frame. This clearly limits the flexibility of the system, especially when it is required to measure objects on site without interfering with the environment.

A need remains for a solution which solves the matching problem independently for each single frame, with only two cameras, a projected pattern which may change and no particular constraint on the observed scene.

SUMMARY

According to one broad aspect, there is provided a method for exploiting the continuity of the blobs to match points in the images.

According to one broad aspect, there is provided a method for matching points between two images of a scene acquired by two cameras, the method including: extracting blobs from the reflection in the images and individually labelling the blobs with a unique identifier; selecting a selected epipolar plane and defining a conjugate epipolar line on each of the images; identifying plausible combinations including a light sheet label of the projected pattern and the unique identifier for a plausible blob selected from the blobs in each of the images; calculating a matching error for each of the plausible combinations; repeating the steps of selecting, identifying and calculating for at least some epipolar planes; determining a most probable combination by computing a figure of merit for the plausible combinations; identifying matching points in the frame from the most probable combination.

According to another broad aspect, there is provided a method for matching points between two images of a scene acquired simultaneously by two cameras, the two images forming a frame, the images each containing a reflection of a projected pattern on the scene, the projected pattern being provided by a light projector unit projecting sheets of light onto the scene, the cameras and the projector unit being calibrated in a common coordinate system, the method including: extracting blobs from the reflection in the images and individually labelling the blobs with a unique identifier; selecting a selected epipolar plane from a set of epipolar planes and defining a conjugate epipolar line on each of the images; identifying plausible combinations, the plausible combinations including a light sheet label of the projected pattern and the unique identifier for a plausible blob selected from the blobs in each of the images, the plausible blob crossing the conjugate epipolar line; calculating a matching error for each of the plausible combinations; repeating the steps of selecting, identifying and calculating for each epipolar plane of the set of epipolar planes; determining a most probable combination by computing a figure of merit for the plausible combinations using the matching error for each epipolar plane of the set of epipolar planes; identifying matching points in the frame from the most probable combination.

According to still another broad aspect, there is provided a system for matching points between two images of a scene, including: a light projector unit projecting sheets of light onto the scene thereby providing a projected pattern on the scene; two cameras for simultaneously acquiring the two images of the scene, the two images forming a frame, the cameras and the projector unit being calibrated in a common coordinate system, the images each containing a reflection of the projected pattern on the scene; a processor for extracting blobs from the reflection in the images and individually labelling the blobs with a unique identifier; selecting a selected epipolar plane from a set of epipolar planes and defining a conjugate epipolar line on each of the images; identifying plausible combinations, the plausible combinations including a light sheet label of the projected pattern and the unique identifier for a plausible blob selected from the blobs in each of the images, the plausible blob crossing the conjugate epipolar line; calculating a matching error for each of the plausible combinations; repeating the steps of selecting, identifying and calculating for each epipolar plane of the set of epipolar planes; determining a most probable combination by computing a figure of merit for the plausible combinations using the matching error for each epipolar plane of the set of epipolar planes; and identifying matching points in the frame from the most probable combination.

According to another broad aspect, there is provided a computer-implemented method performed by at least one computer processor for matching points between two images of a scene, the method including: retrieving two images acquired by a sensor, the two images forming a frame captured at a single relative position between the scene and the sensor, the images each containing a reflection of a projected pattern on the scene; extracting blobs from the reflection in the images and individually labelling the blobs with a unique identifier; selecting a selected epipolar plane from a set of epipolar planes and defining a conjugate epipolar line on each of the images; identifying plausible combinations, the plausible combinations including a light sheet label of the projected pattern and the unique identifier for a plausible blob selected from the blobs in each of the images, the plausible blob crossing the conjugate epipolar line; calculating a matching error for each of the plausible combinations; repeating the steps of selecting, identifying and calculating for each epipolar plane of the set of epipolar planes; determining a most probable combination by computing a figure of merit for the plausible combinations using the matching error for each epipolar plane of the set of epipolar planes; identifying matching points in the frame from the most probable combination; generating an output identifying the matching points in the frame.

According to still another broad aspect, there is provided a computer program product comprising a computer readable memory storing computer executable instructions thereon that when executed by at least one computer processor perform the method steps listed above.

In one embodiment, the sensor has two cameras and a light projector unit, the projected pattern being provided by the light projector unit projecting at least one sheet of light onto the scene, the cameras and the light projector unit being calibrated in a common coordinate system.

In one embodiment, the method further comprises validating the matching points to discard the matching points if the figure of merit fails to meet a quality of match threshold.

In one embodiment, the method further comprises repeating the computer-implemented method for a plurality of frames.

In one embodiment, the method further comprises calculating sets of 3D points using the matching points in the frame.

In one embodiment, the method further comprises estimating a position of the sensor at each frame to integrate the 3D points in a common coordinate system, wherein the estimating the position of the sensor includes using at least one of targets affixed to the scene, a geometry of the scene and a texture of the scene.

In one embodiment, the method further comprises exploiting the images for the calculating the sets of 3D points to obtain segments of 3D curves.

According to another broad aspect, there is provided a system for matching points between two images of a scene, including: a sensor including a light projector unit projecting at least one sheet of light onto the scene thereby providing a projected pattern on the scene; and two cameras for acquiring the two images of the scene, the two images forming a frame captured at a single relative position between the scene and the sensor, the images each containing a reflection of the projected pattern on the scene; wherein the cameras and the light projector unit are calibrated in a common coordinate system; and at least one computer processor in electronic communications with the sensor for retrieving the two images acquired by the cameras; extracting blobs from the reflection in the images and individually labelling the blobs with a unique identifier; selecting a selected epipolar plane from a set of epipolar planes and defining a conjugate epipolar line on each of the images; identifying plausible combinations, the plausible combinations including a light sheet label of the projected pattern and the unique identifier for a plausible blob selected from the blobs in each of the images, the plausible blob crossing the conjugate epipolar line; calculating a matching error for each of the plausible combinations; repeating the steps of selecting, identifying and calculating for each epipolar plane of the set of epipolar planes; determining a most probable combination by computing a figure of merit for the plausible combinations using the matching error for each epipolar plane of the set of epipolar planes; and identifying matching points in the frame from the most probable combination; at least one computer output in electronic communications with the processor for generating an output identifying the matching points in the frame.

In one embodiment, the light projector unit includes two light projectors each projecting at least one sheet of light onto the scene, the projected pattern being provided by a single one of the two light projectors at each frame and the projected pattern differing for each of the two light projectors.

In one embodiment, the at least one sheet of light is a plane of light.

According to yet another broad aspect, there is provided a computer readable memory having recorded thereon statements and instructions for execution by at least one computer processor, the statements and instructions comprising: code means for retrieving two images acquired by a sensor, the two images forming a frame captured at a single relative position between the scene and the sensor, the images each containing a reflection of a projected pattern on the scene; code means for extracting blobs from the reflection in the images and individually labelling the blobs with a unique identifier; code means for selecting a selected epipolar plane from a set of epipolar planes and defining a conjugate epipolar line on each of the images; code means for identifying plausible combinations, the plausible combinations including a light sheet label of the projected pattern and the unique identifier for a plausible blob selected from the blobs in each of the images, the plausible blob crossing the conjugate epipolar line; code means for calculating a matching error for each of the plausible combinations; code means for repeating the steps of selecting, identifying and calculating for each epipolar plane of the set of epipolar planes; code means for determining a most probable combination by computing a figure of merit for the plausible combinations using the matching error for each epipolar plane of the set of epipolar planes; code means for identifying matching points in the frame from the most probable combination; code means for generating an output identifying the matching points in the frame.

BRIEF DESCRIPTION OF THE DRAWINGS

The above-mentioned features and objects of the present disclosure will become more apparent with reference to the following description taken in conjunction with the accompanying drawings, wherein like reference numerals denote like elements and in which:

FIG. 1 includes FIG. 1A and FIG. 1B, wherein

FIG. 7 includes FIG. 7A and FIG. 7B, wherein

DETAILED DESCRIPTION

In order to efficiently find matches in every frame using two cameras, a system and computer-implemented method are proposed.

Figure 1A:
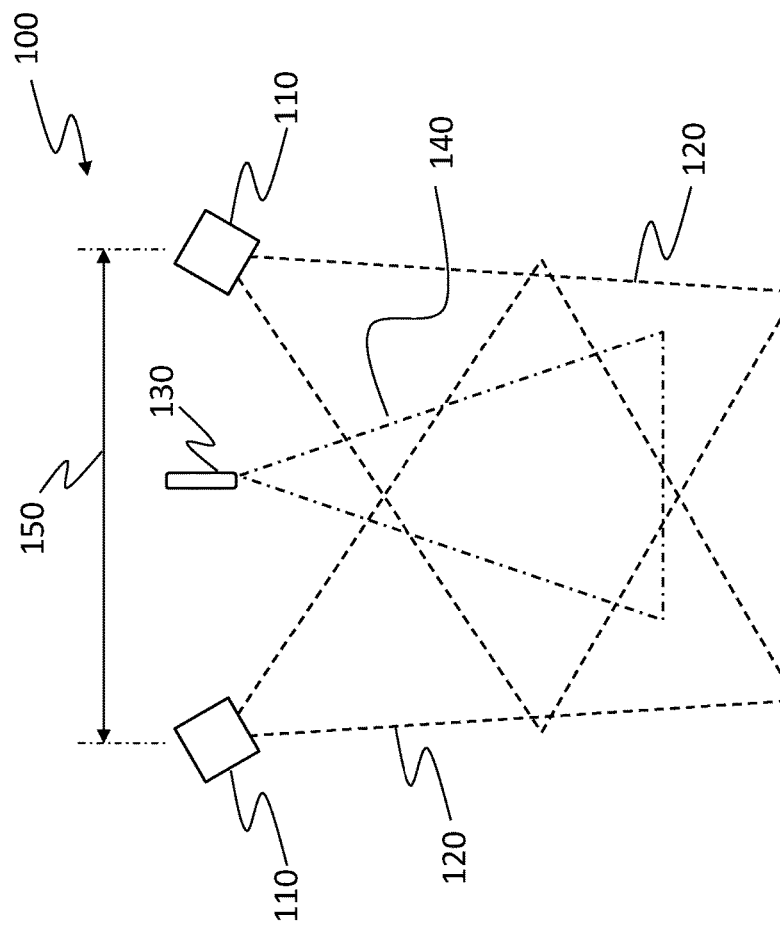
FIG. 1A is an illustration of an example system configuration with a light projector unit and FIG. 1B is an illustration of an example system configuration with a light projector unit which includes two light projectors.
Figure 1B:
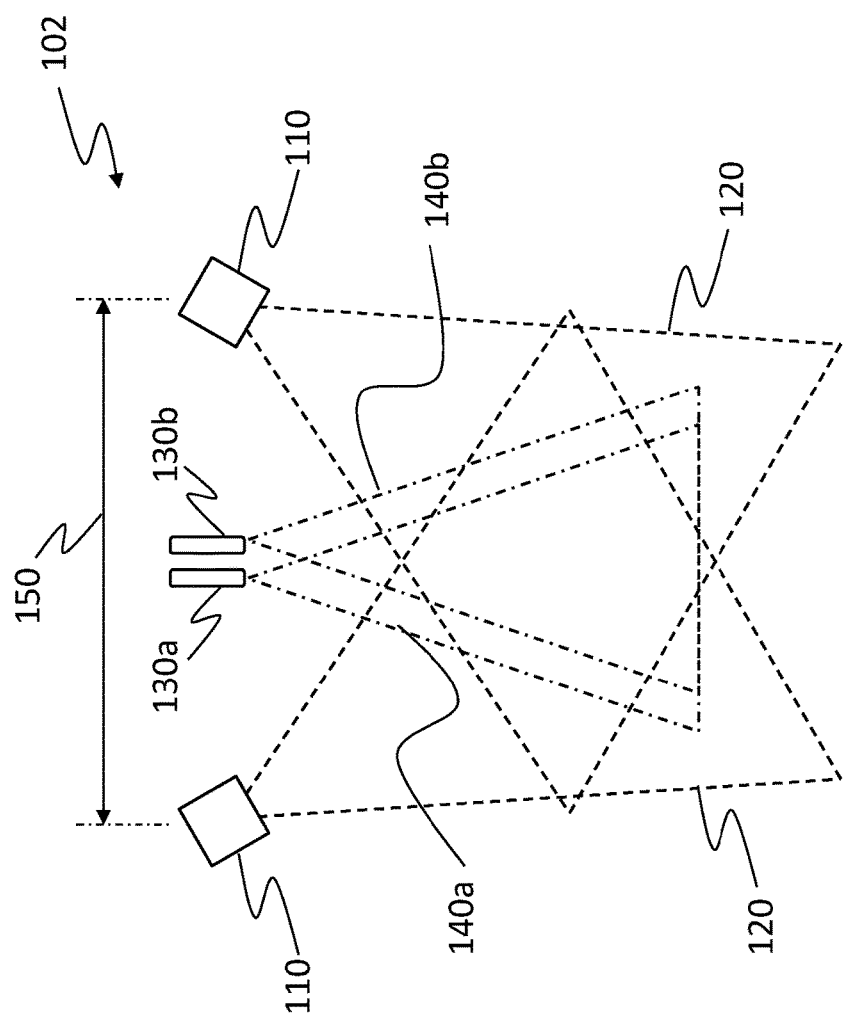

FIG. 1 illustrates an example embodiment of the sensor 100. One or more light projector units 130 are mounted between the two cameras 110. Each camera 110 has a field of view 120. Each light projector unit 130 projects a pattern within a respective span 140, labelled 140a and 140b. In FIG. 1A, the light projector unit 130 includes a single light projector. In FIG. 1B, the sensor 102 has a different embodiment for the light projector unit which includes two light projectors 130a, 130b. The light projectors could be laser light projectors, white light projectors etc.

Figure 2:
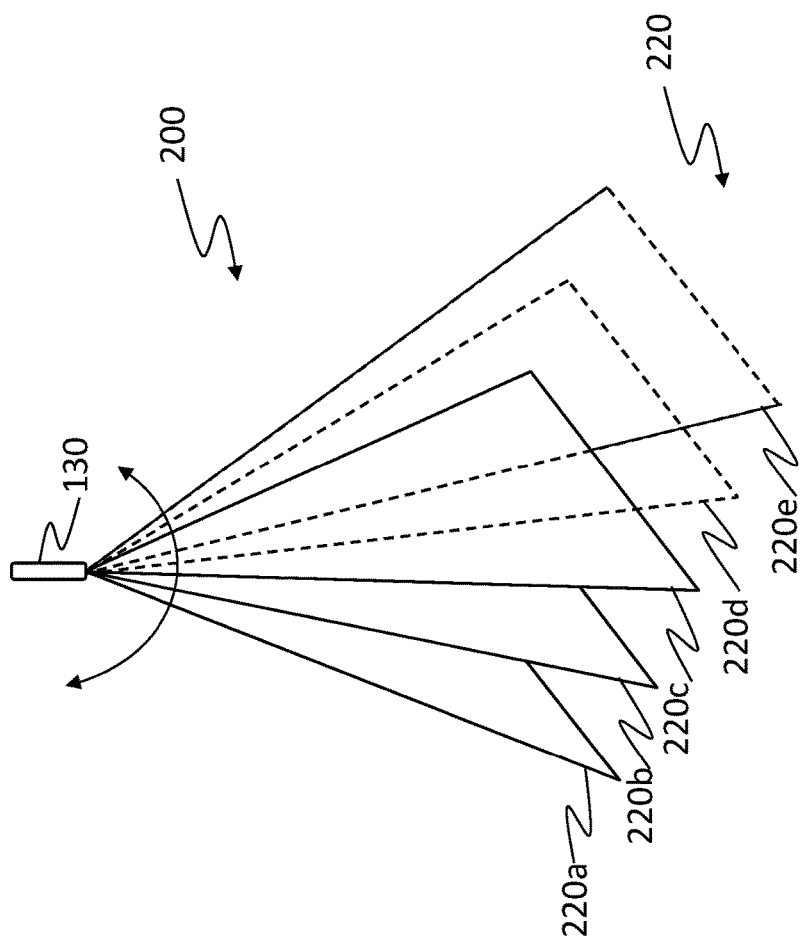
FIG. 2 is an illustration of a light projector unit projecting a set of light planes.

In one example embodiment, the baseline 150 between the cameras 110 is 170 mm and the focal length of the lens of the cameras is 5.7 mm. The vergence of the optical axes of the two cameras is about 30°. For the light projector unit 130 shown in FIG. 2, the number of light planes is 5 but can vary, for example between 1 and 15 or even more. An example embodiment 200 of a light projector unit 130 that produces 5 light planes 220, labelled 220a, 220b, 220c, 220d and 220e, is illustrated in FIG. 2.

Figure 3:
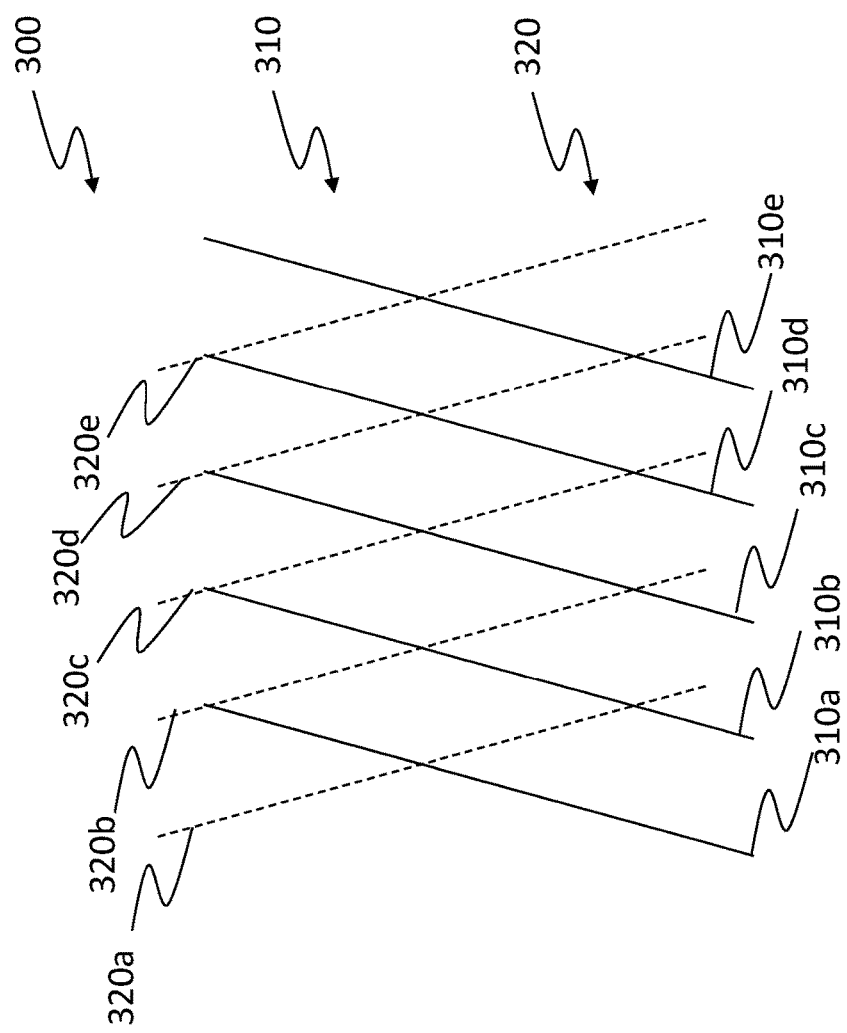
FIG. 3 is an illustration of two combined patterns reflected from a planar surface.

In the embodiment of FIG. 1B, the two light projectors 130a, 130b are oriented so as to produce different patterns creating intersecting curves 300 on the surface as shown in FIG. 3. The system will alternately project each pattern. Two sets of curves 310 and 320 are projected by projectors 130a, 130b respectively. They are labelled 310a, 310b, 310c, 310d and 310e and 320a, 320b, 320c, 320d and 320e. For example, in the example embodiment of FIG. 1B, the light projectors 130a and 130b are themselves oriented at an angle to the object, for example +30° and −30°, to produce the different patterns.

As will be readily understood, a projection unit 130 could include a programmable light projector unit which could project more than one pattern of light. For example, a projection unit 130 could be programmed to project the two sets of intersecting curves 300 and an additional light plane simultaneously or alternatively.

The cameras 110 and the light projector unit 130 are calibrated in a common coordinate system. This means that intrinsic parameters, including distortion parameters, as well as extrinsic parameters for both cameras 110 are measured. Each of the sheets of light that are projected, are calibrated in the same coordinate system. In this example, the sheets of light are planar approximations. It is also possible to affix bandpass filters on the camera lenses to match the wavelength of the projector. This will reduce interferences from ambient light and other sources.

Using such a sensor 100 with at least one computer processor, 3D points can be obtained after applying the following computer-implemented method. Two images of a frame are captured using two cameras 110. The two images are captured simultaneously, meaning that there is no relative displacement between the scene and the sensor 100 during the acquisition of the images or that this relative displacement is negligible. The cameras are synchronized to either capture the images at the same time or sequentially during an extended period of time in which the relative position of the sensor 100 with respect to the scene remains the same or varies within a predetermined negligible range. Both of these cases are considered to be a simultaneous capture of the images by the sensor.

Once the two images of a frame have been captured, image processing is applied. The two images contain the reflection of the projected pattern in the scene, from the two respective viewpoints of the cameras 110. The reflected pattern appears as a set of curve sections in each image. These curve sections appear lighter than the background in the images and can be segmented using state of the art techniques. One technique consists in thresholding the image signal. Segmentation validation can be applied since the profile of a curve is typical; it appears in an image as a crest profile. The width can also be validated. To reduce an impact of noise, the length of a curve segment will also exceed a minimum threshold that is set to a predetermined number of pixels, such as 2 pixels, for example. The pixels that are part of the same connected component define a blob that is indexed with a label. The position of the center of the profile section is finally estimated for each pixel line along the blob before joining these centers to compose a polyline.

Figure 4:
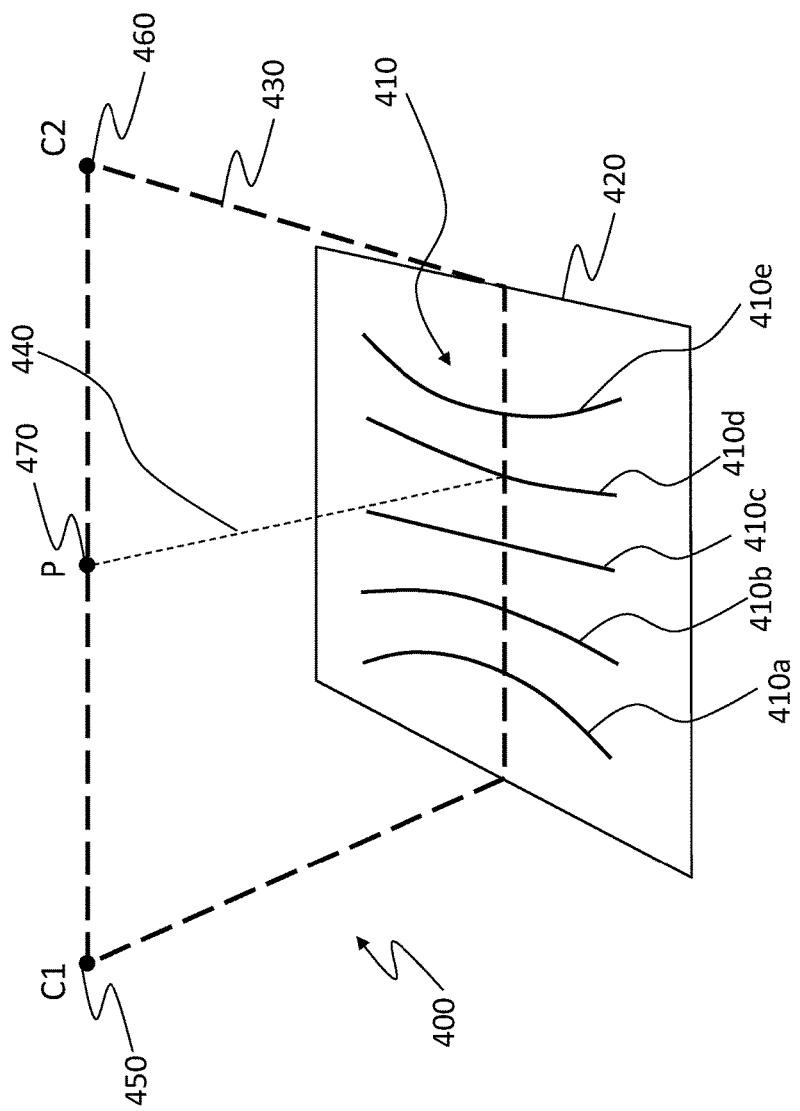
FIG. 4 is a representation of an epipolar plane overlaid on a scene.

Once the two images of a frame have been segmented, an epipolar plane is selected. An example epipolar plane 430 is shown in FIG. 4 which is an illustration 400 of an epipolar plane 430 overlaid on a scene 420. The epipolar planes share a common line segment between the center of projection 450 and 460 of the two cameras C1 and C2. The line segment C1-C2 acts as a rotational axis for defining the epipolar planes. Thus, the set of epipolar planes can be indexed using a parameter angle or, equivalently, a pixel coordinate in an image. An epipolar plane intersects the two image planes and thus defines two conjugate epipolar lines. Without loss of generality, assuming a rectified stereo pair of images, each image line is an index of an epipolar plane. In the case illustrated in FIG. 4, the scene 420 is planar. A ray 440 arising from the center of projection 470 of Projector P is shown in dotted line. The curve profiles 410 reflected from the scene 420 are apparent. They are labelled 410a, 410b, 410c, 410d and 410e.

Figure 5:
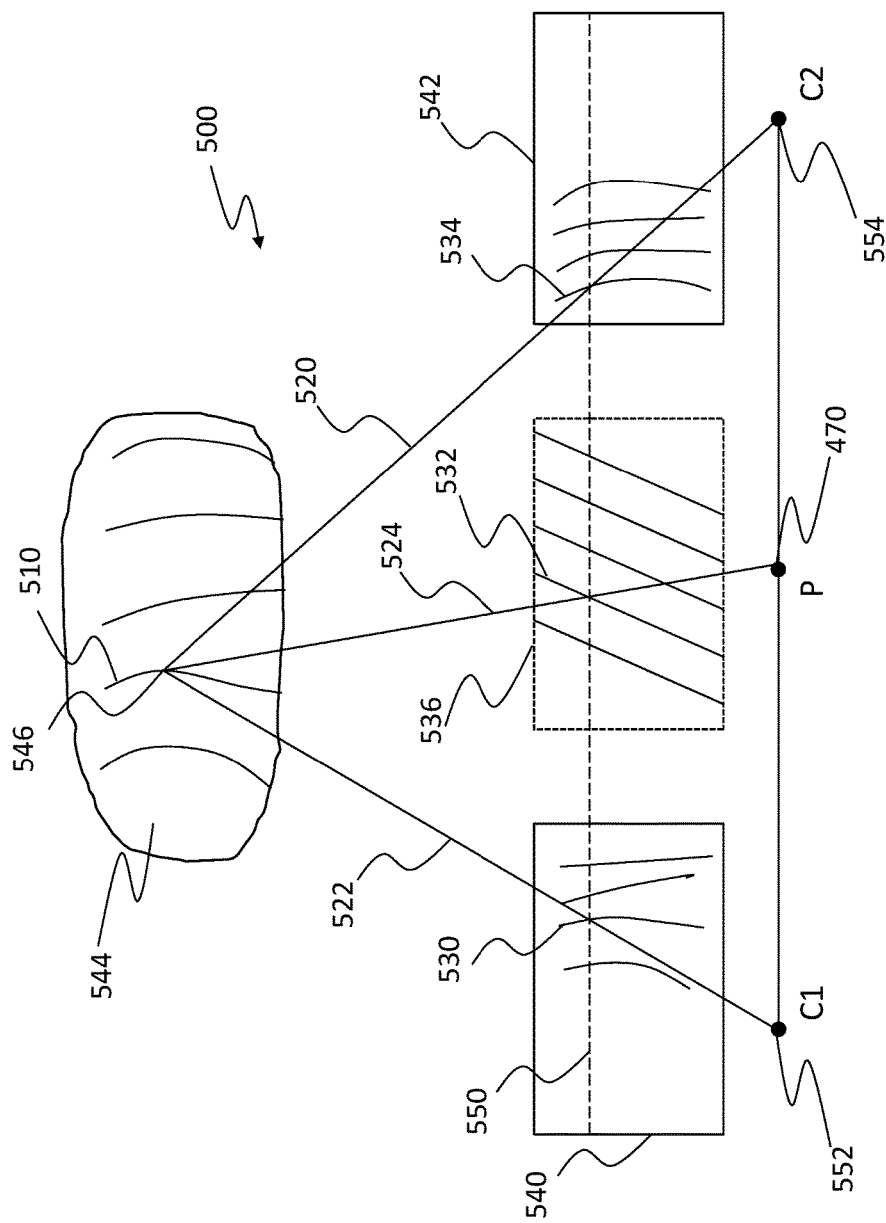
FIG. 5 depicts a view of the images, a projected pattern and its reflection on an object.

FIG. 5 depicts a view 500 of the images, a projected pattern and its reflection on an object. For each epipolar plane, or equivalently for each line of pixels in the images, the segmented blobs crossing the current line in both images are identified to generate a list of blob indices for each image. The first camera C1 is represented by its center of projection 552 and its image plane 540. The second camera C2 is represented by its center of projection 554 and its image plane 542. The projector P is illustrated by a center of projection 470 and an image plane 536. It is not necessary that the center of projection 470 of the projector be located on the baseline between the centers of projection 552, 554 of the cameras although it is the case in the example embodiment of FIG. 5.

The intersection 550 between the image planes and the epipolar plane is shown using a dotted line. Rays 522, 520 and 524 belong to the same epipolar plane. The projector projects a light plane 532 onto the object 544, thus producing a reflected curve 510. This reflected curve 510 is then imaged in the first image captured by the first camera C1 (imaged curve 530) while it is also imaged in the second image captured by the second camera C2 (imaged curve 534). Point 546 on reflected curve 510 is then present on imaged curves 530, 534 and should be properly identified and matched in these images to allow finding its 3D coordinates. The imaged curves 530, 534 intersect the illustrated epipolar plane on intersection 550 along rays 522 and 520, originating from the reflected curve 510 on the object 544.

Figure 6:
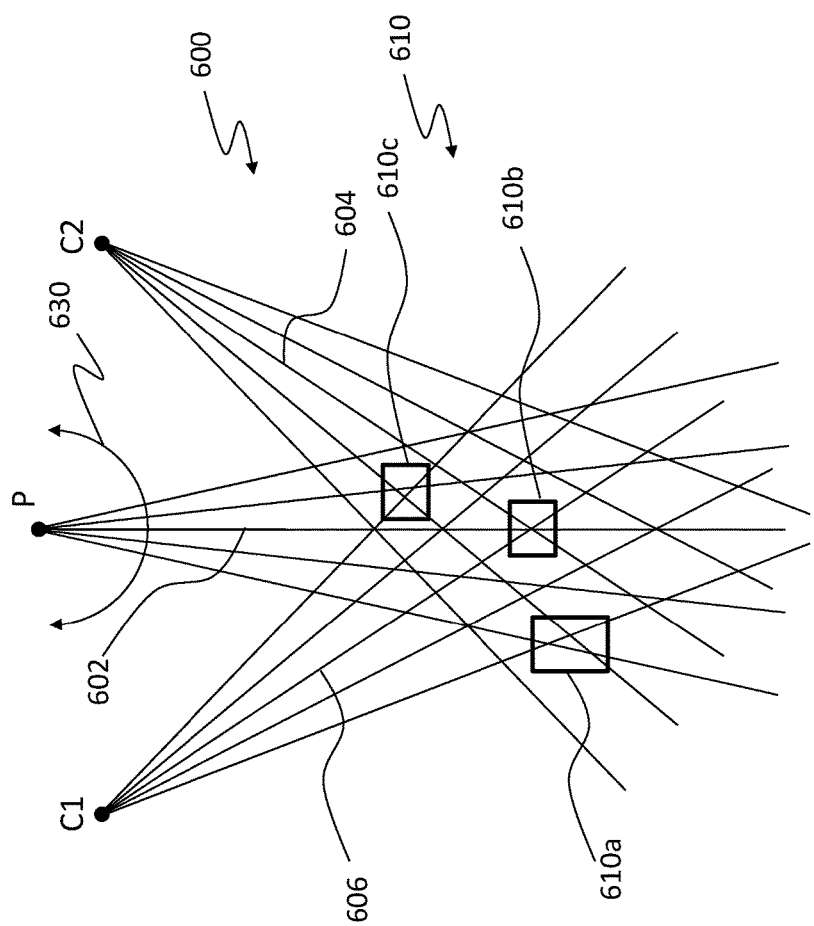
FIG. 6 is a representation of ray crossings from the two cameras and light projector unit.

Since the light projector unit and the cameras are calibrated in the same coordinate system, it is possible to index triplets of indices where a triplet (I1 I2, IP) is composed of the index of the curve in the first image I1, the index of a candidate corresponding curve in the second image I2 and the index of the light sheet in the projector IP. The number of possible combinations is $O(N^3)$ which is the order of growth of the number of combinations as N, the number of light sheets in the projected pattern, grows. In order to limit the number of combinations, one may analyze the intersections 610 of the line rays within the epipolar plane and attribute an error measure to a given intersection. FIG. 6 is a representation 600 of ray crossings from the two cameras and the projector. Rays 604 and 606 are captured by cameras C2 and C1 respectively. Ray 602 is projected by the projector P. For the projector P, the rays can be indexed using an angle 630. Some intersections 610 are a more probable match, such as intersection 610b which appears to cross in a single point while other intersections, such as intersections 610a and 610c have a greater error.

Figure 7B:
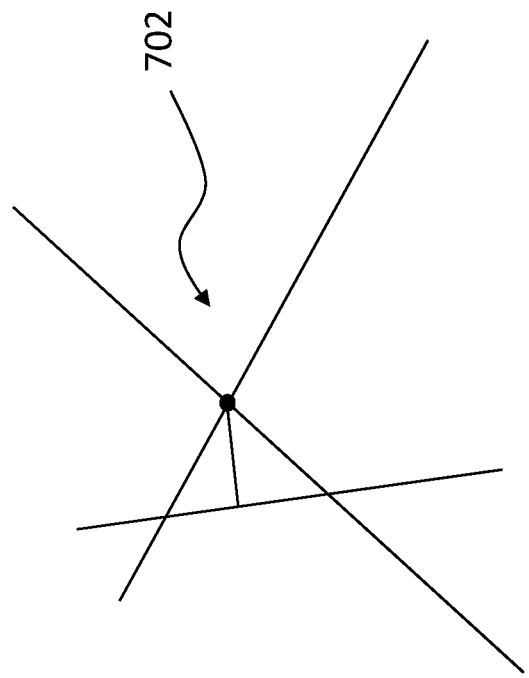
FIG. 7B depicts another way of measuring the quality of a match.
Figure 7A:
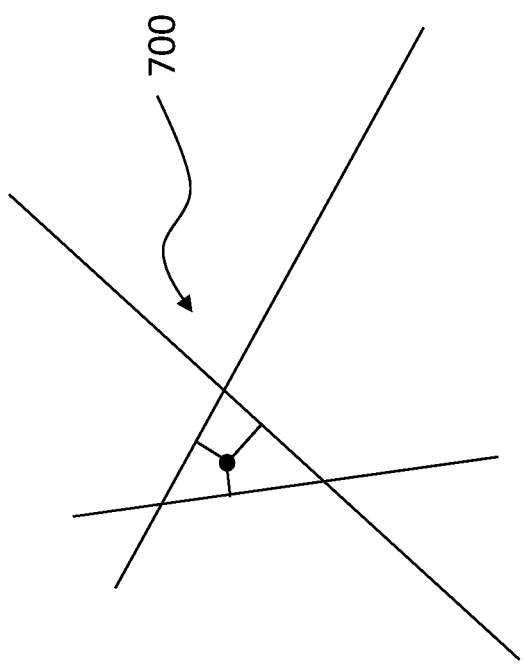
FIG. 7A depicts one way of measuring the quality of a match.

FIGS. 7A and 7B illustrate two example error measurements that can be attributed to an intersection. In FIG. 7A, the error measure 700 is the minimal sum of distances between a point and each of the three rays. In FIG. 7B, the error measure 702 is the distance between the intersection of the two camera rays and the projector ray. Other variants are possible. The number of plausible combinations can be reduced significantly after imposing a threshold to the obtained values. When the sheets of light of the projector can be approximated by planes that are indexed by an angle, the second error measure can be computed efficiently while allowing one to keep only the closest plane. This will reduce the matching complexity to $O(N^2)$.

After completing these operations, one obtains a list of triplets of potential matches where each is attributed an error and the index of the epipolar plane. This operation is repeated for all epipolar planes crossing blob segments, typically (although not necessarily) for all rows of pixels in the rectified images.

Figure 8:
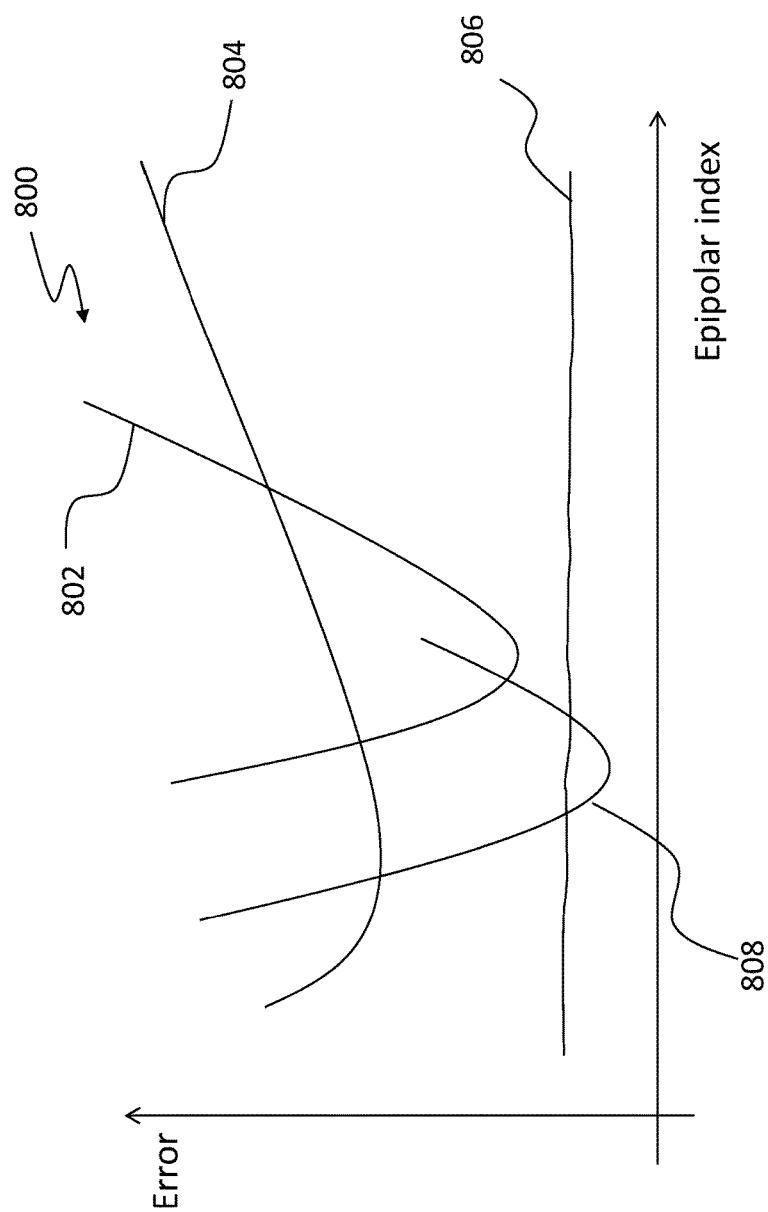
FIG. 8 depicts a graph of the matching error for a set of blobs.

The triplets along with their associated error and epipolar index are then tracked against the epipolar index. In FIG. 8, a graph 800 of the errors with respect to the epipolar index is depicted for each of four triplets with curves 802, 804, 806 and 808. Graph 800 combines the information for all plausible triplets. More importantly it integrates, for a given triplet, all the information for a blob along the epipolar planes. Thus, for example, after calculating the average error for a given curve, one will obtain a figure of merit for matching the corresponding triplet. In FIG. 8, the triplet whose error is depicted at curve 806 would produce the best figure of merit in this example. The average error can be further validated after applying a threshold. One can also further validate by making sure there is no ambiguity. Actually, for short curve sections, it is possible that more than one triplet will present a low average error. In this case, the match would be rejected. It is worth noting that a curve may locally reach a lower minimum than the curve with the best figure of merit such as is the case with curve 808. This will happen, for instance, when the projected light sheet is not perfectly calibrated or when there is higher error in peak detection of the curves in the images. FIG. 8 further shows that the identified curves are not necessarily of the same length. That will depend on the visibility of the reflected curved in both images.

After completion of the matching step for a given frame, 3D points are calculated from the observations for each triplet. For that purpose, one may minimise the distance between the 3D point and each of the three rays in space. It is then assumed that the projected light sheets are very well calibrated, either parametrically or using a look-up table (LUT) to eventually obtain more accurate measurements. In practical applications, the projected light sheet produced through commercial optic components may not correspond exactly to a plane. For this reason, the use of a LUT may be more appropriate. Another possible approach consists in only exploiting the images from the two cameras for the final calculation of the 3D points. One may otherwise minimise the reprojection error of a 3D point, in the 2D images. It is then not necessary to accurately calibrate the projected planes. Moreover, in this latter case, the 3D measurement is less affected by the profile of the reflected signal such as a texture discontinuity on the surface of the object. The resulting 3D points are more accurate. After calculating the sets of 3D points, one obtains segments of 3D curves.

Figure 9:
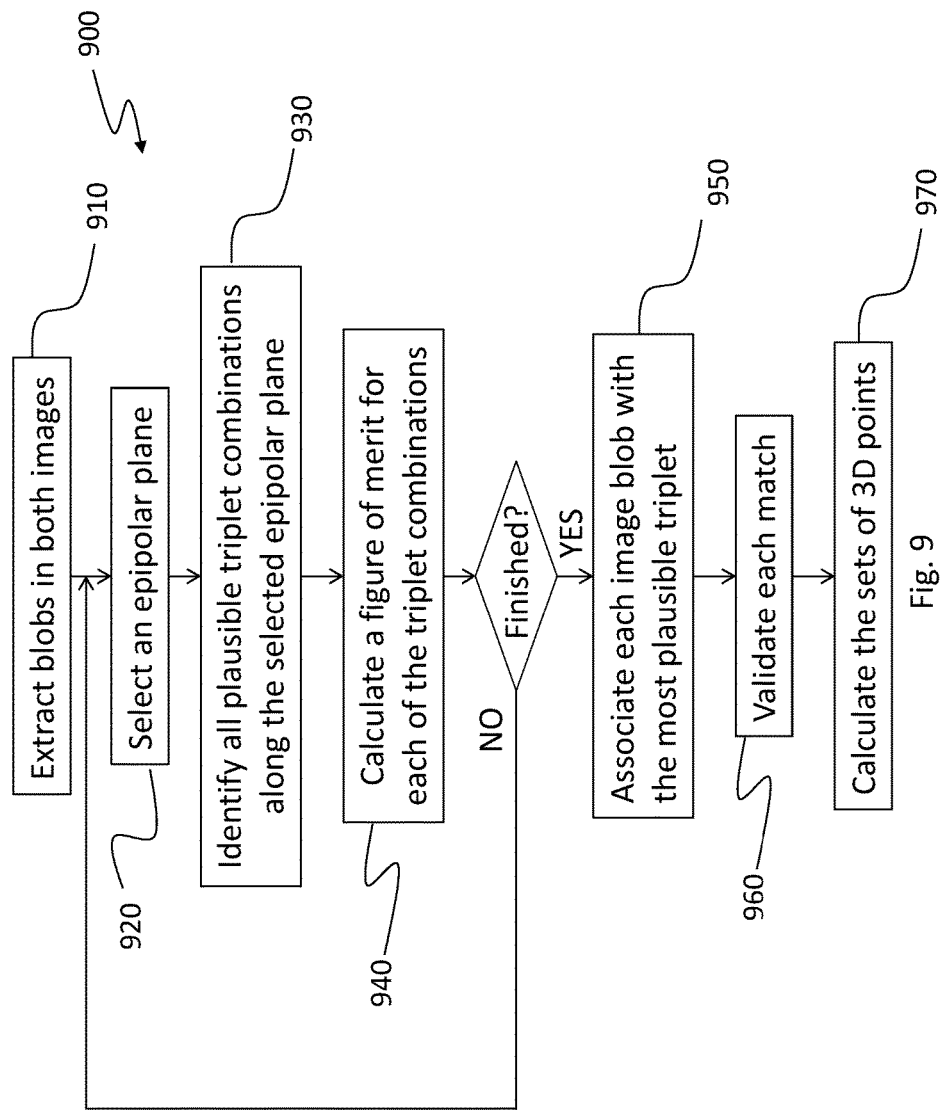
FIG. 9 is a flowchart of an example method for matching and producing 3D points.

Example steps for the matching method 900 are shown in FIG. 9. Blobs are extracted 910 in both images. An epipolar plane is selected 920. All plausible triplet combinations along the selected epipolar plane are identified 930. A figure of merit is calculated 940 for each of the triplet combinations. When all figures of merit are calculated, each image blob is associated 950 with the most plausible triplet. Each match is validated 960. The sets of 3D points are then calculated 970.

The method benefits from the spatial continuity of the blobs that are matched over several epipolar planes as opposed to independent matching along each of the epipolar planes. Nevertheless, it is still possible that some matching errors remain. For instance, a blob may appear as a "Y" shape structure in one image, due to the incidental projection of two curves on a specific geometry. Furthermore, if the number of planes increases, for instance beyond 15, the number of ambiguities may also increase. However, those ambiguities would have to stay persistent from one frame to the other to affect the surface when a surface reconstruction method such as that described in U.S. Pat. No. 7,487,063 takes the 3D points as input. Actually, this type of approach is well adapted for eliminating outlier observations since the surface is reconstructed in areas where multiple observations have been acquired.

When integrated in a mobile 3D sensor system, that is when there is relative motion between the object and the sensor, the system estimates its position at each frame in order to integrate 3D points in a common coordinate system. The system may estimate the position of the sensor at each frame using targets, such as retro-reflective targets, for example, or using the geometry or texture of the object when the object is rigid (or "quasi-rigid"). When the system further integrates a camera that captures the texture, the pose of the sensor may also be calculated after matching texture characteristics.

In the example embodiment shown in FIG. 3, two such sets of light sheets produce two sets of curves 310 and 320, in this case parallel lines, when projected on a plane. The system then projects alternating sets of light sheets with different orientations. The 3D curve sections that would be captured on the surface of an object make it possible to estimate local tangent vectors on the surface of the observed object. Moreover, while alternating light sheet sets, local tangent vectors can be calculated along different directions and from these 3D tangent vectors, one will calculate the surface normal orientation on the surface. Surface normal information can help improve 3D surface reconstruction.

Figure 10:
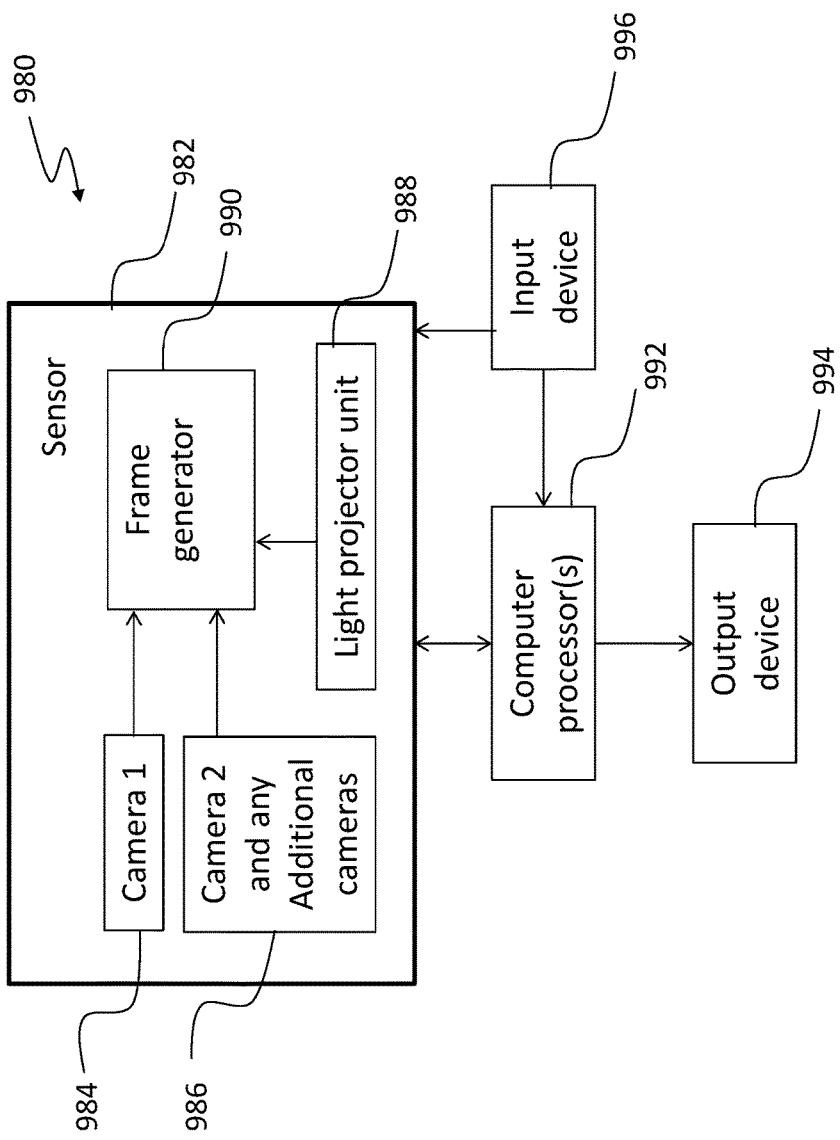
FIG. 10 is a block diagram of example main components of the system for matching and producing 3D points.

FIG. 10 is a block diagram showing example main components of the system 980. The sensor 982 includes a first camera 984 and at least a second camera 986 as well as a light projector unit 988 including at least one light projector. A frame generator 990 may be used to assemble the images captured by the cameras in a single frame. The sensor 982 is in communications with at least one computer processor 992 for implementing the processing steps to match points between the images of the frame. The computer processor(s) 992 is in electronic communications with an output device 994 to output the matched points and/or any additional or intermediary outputs. As will be readily understood, it may be necessary to input data for use by the processor(s) 992 and/or the sensor 982. Input device(s) 996 can therefore be provided for this purpose.

As will be readily understood, although the method described herein is carried out with two images thereby forming triplet combinations, more than two images could be acquired per frame and the combinations could contain more than three elements. Alternatively or additionally, if more than two images are acquired per frame, the triplet combinations for two of these images could be used to match the points and the additional image(s) could be used to validate the match.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, for example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field- Programmable Gate Arrays). A computer can generally also receive programs and data from a storage medium such as an internal disk (not shown) or a removable disk. These elements will also be found in a conventional desktop, a portable computer or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. Other mobile devices such as tablets, phablets, smartphones, personal digital assistants, portable computers, laptops, wearable computers, etc. suitable to execute the computer programs described herein could also be used.

Although the above description relates to example embodiments as presently contemplated by the inventors, it will be understood that the invention in its broad aspect includes equivalents and variants of the elements described herein. The embodiments described above are intended to be exemplary only. The scope of the invention is therefore intended to be limited solely by the appended claims.

The invention claimed is:

1. A computer-implemented method performed by at least one computer processor for matching points between two images of a scene, the method including:
    retrieving two images acquired by a sensor, said sensor comprising at least a first camera, a second camera and a light projector unit, the light projector unit projecting a projected pattern onto said scene, said two images forming a frame captured at a single relative position between the scene and the sensor, said images each containing a reflection of the projected pattern projected by the light projector unit on said scene, wherein the projected pattern comprises at least one sheet of light, each sheet of light being labelled with a corresponding light sheet label;
    extracting blobs from said reflection in said images and individually labelling said blobs with a unique identifier;
    selecting a selected epipolar plane from a set of epipolar planes and defining a conjugate epipolar line on each of said images, wherein the selected epipolar plane of the set of epipolar planes is defined by a center of projection of each of the first and the second cameras and a corresponding point located on an extracted blob;
    identifying plausible combinations, said plausible combinations including a light sheet label of said projected pattern and said unique identifier for a plausible blob selected from said blobs in each of said images, said plausible blob crossing the conjugate epipolar line;
    calculating a matching error for each of the plausible combinations, wherein the matching error of a given plausible combination is indicative of a proximity between intersections of each pair of three rays, wherein a first ray originates from the center of projection of the first camera and reaches the plausible blob crossing the conjugate epipolar line, wherein a second ray originates from the center of projection of the second camera and reaches the plausible blob crossing the conjugate epipolar line and the third ray originates from a center of projection of the light projector unit and reaches an intersection between the selected epipolar plane and a corresponding sheet of light of the at least one sheet of light;
    repeating said steps of selecting, identifying and calculating for each epipolar plane of said set of epipolar planes;
    determining a most probable combination by computing a figure of merit for said plausible combinations using said matching error for each epipolar plane of said set of epipolar planes;
    identifying matching points between the two images in said frame using said determined most probable combination and the set of epipolar planes;
    generating an output identifying said matching points in said frame.

2. The method as claimed in claim 1, wherein the first camera, the second camera and the light projector unit are calibrated in a common coordinate system.

3. The method as claimed in claim 1, further comprising validating said matching points to discard said matching points if said figure of merit fails to meet a quality of match threshold.

4. The method as claimed in claim 1, further comprising repeating said computer-implemented method for a plurality of frames.

5. The method as claimed in claim 1, further comprising calculating sets of 3D points using said matching points in said frame.

6. The method as claimed in claim 5, further comprising estimating a position of the sensor at each frame to integrate said 3D points in a common coordinate system, wherein said estimating said position of the sensor includes using at least one of targets affixed to said scene, a geometry of said scene and a texture of said scene.

7. The method as claimed in claim 5, further comprising exploiting the images for said calculating said sets of 3D points to obtain segments of 3D curves.

8. A system for matching points between two images of a scene, including:
    a sensor including
        a light projector unit projecting at least one sheet of light onto said scene thereby providing a projected pattern on said scene, each sheet of light being labeled with a corresponding light sheet label; and
        at least a first camera and a second camera, each camera for acquiring a respective image of said two images of said scene, said two images forming a frame captured at a single relative position between the scene and the sensor, said images each containing a reflection of said projected pattern on said scene;
        wherein the first camera, the second camera and the light projector unit are calibrated in a common coordinate system; and
    at least one computer processor in electronic communications with said sensor for retrieving said two images acquired by said cameras;
        extracting blobs from said reflection in said images and individually labelling said blobs with a unique identifier;
        selecting a selected epipolar plane from a set of epipolar planes and defining a conjugate epipolar line on each of said images, wherein the selected epipolar plane of the set of epipolar planes is defined by a center of projection of each of the first and the second cameras and a corresponding point located on an extracted blob;
        identifying plausible combinations, said plausible combinations including a light sheet label of said projected pattern and said unique identifier for a plausible blob selected from said blobs in each of said images, said plausible blob crossing the conjugate epipolar line;

calculating a matching error for each of the plausible combinations, wherein the matching error of a given plausible combination is indicative of a proximity between intersections of each pair of three rays, wherein a first ray originates from the center of projection of the first camera and reaches the plausible blob crossing the conjugate epipolar line, wherein a second ray originates from the center of projection of the second camera and reaches the plausible blob crossing the conjugate epipolar line and the third ray originates from a center of projection of the light projector unit and reaches an intersection between the selected epipolar plane and a corresponding sheet of light of the at least one sheet of light;

repeating said steps of selecting, identifying and calculating for each epipolar plane of said set of epipolar planes;

determining a most probable combination by computing a figure of merit for said plausible combinations using said matching error for each epipolar plane of said set of epipolar planes; and identifying matching points between the two images in said frame using the determined most probable combination and the set of epipolar planes;

at least one computer output in electronic communications with said processor for generating an output identifying said matching points in said frame.

9. The system as claimed in claim 8, wherein said light projector unit includes two light projectors each projecting at least one sheet of light onto said scene, said projected pattern being provided by a single one of said two light projectors at each frame and said projected pattern differing for each of said two light projectors.

10. The system as claimed in claim 8, wherein said at least one sheet of light is a plane of light.

11. A computer readable memory having recorded thereon statements and instructions for execution by at least one computer processor, said statements and instructions comprising:

code means for retrieving two images acquired by a sensor, said sensor comprising a first camera, a second camera and a light projector unit, the light projector unit projecting a projected pattern onto said scene, said two images forming a frame captured at a single relative position between the scene and the sensor, said images each containing a reflection of a projected pattern on said scene, wherein the projected pattern comprises at least one sheet of light, each sheet of light being labeled with a corresponding light sheet label;

code means for extracting blobs from said reflection in said images and individually labelling said blobs with a unique identifier;

code means for selecting a selected epipolar plane from a set of epipolar planes and defining a conjugate epipolar line on each of said images;

code means for identifying plausible combinations, said plausible combinations including a light sheet label of said projected pattern and said unique identifier for a plausible blob selected from said blobs in each of said images, said plausible blob crossing the conjugate epipolar line;

code means for calculating a matching error for each of the plausible combinations, wherein the matching error of a given plausible combination is indicative of a proximity between intersections of each pair of three rays, wherein a first ray originates from the center of projection of the first camera and reaches the plausible blob crossing the conjugate epipolar line, wherein a second ray originates from the center of projection of the second camera and reaches the plausible blob crossing the conjugate epipolar line and the third ray originates from a center of projection of the light projector unit and reaches an intersection between the selected epipolar plane and a corresponding sheet of light of the at least one sheet of light;

code means for repeating said steps of selecting, identifying and calculating for each epipolar plane of said set of epipolar planes;

code means for determining a most probable combination by computing a figure of merit for said plausible combinations using said matching error for each epipolar plane of said set of epipolar planes;

code means for identifying matching points between the two images in said frame using the determined most probable combination and the set of epipolar planes;

code means for generating an output identifying said matching points in said frame.

12. A non-transitory computer readable storage medium for storing computer-executable instructions which, when executed, cause a computer to a method for performing matching points between two images of a scene, the method including:

retrieving two images acquired by a sensor, said sensor comprising at least a first camera, a second camera and a light projector unit, the light projector unit projecting a projected pattern onto said scene, said two images forming a frame captured at a single relative position between the scene and the sensor, said images each containing a reflection of the projected pattern projected by the light projector unit on said scene; wherein the projected pattern comprises at least one sheet of light, each sheet of light being labelled with a corresponding light sheet label;

extracting blobs from said reflection in said images and individually labelling said blobs with a unique identifier;

selecting a selected epipolar plane from a set of epipolar planes and defining a conjugate epipolar line on each of said images; wherein the selected epipolar plane of the set of epipolar planes is defined by a center of projection of each of the first and the second cameras and a corresponding point located on an extracted blob;

identifying plausible combinations, said plausible combinations including a light sheet label of said projected pattern and said unique identifier for a plausible blob selected from said blobs in each of said images, said plausible blob crossing the conjugate epipolar line;

calculating a matching error for each of the plausible combinations; wherein the matching error of a given plausible combination is indicative of a proximity between intersections of each pair of three rays, wherein a first ray originates from the center of projection of the first camera and reaches the plausible blob crossing the conjugate epipolar line, wherein a second ray originates from the center of projection of the second camera and reaches the plausible blob crossing the conjugate epipolar line and the third ray originates from a center of projection of the light projector unit and reaches an intersection between the selected epipolar plane and a corresponding sheet of light of the at least one sheet of light;

repeating said steps of selecting, identifying and calculating for each epipolar plane of said set of epipolar planes;

determining a most probable combination by computing a figure of merit for said plausible combinations using said matching error for each epipolar plane of said set of epipolar planes;

identifying matching points between the two images in said frame using said determined most probable combination and the set of epipolar planes;

generating an output identifying said matching points in said frame.

* * * * *